United States Patent [19]
Williamson et al.

[11] Patent Number: 5,370,976
[45] Date of Patent: Dec. 6, 1994

[54] METALLIC COLOR PRINTING PROCESS

[75] Inventors: Jesse S. Williamson, Dallas; George V. Barnaby, Irving; Gary V. Doughty, Dallas, all of Tex.

[73] Assignee: Williamson Printing Corporation, Dallas, Tex.

[21] Appl. No.: 887,510

[22] Filed: May 22, 1992

[51] Int. Cl.[5] .......................... G03C 7/00; G03C 5/00; G03F 9/00; H04N 1/21

[52] U.S. Cl. .................................. 430/358; 430/359; 430/22; 430/30; 358/798; 358/534; 358/536

[58] Field of Search ................ 430/358, 359, 30, 293, 430/301, 21, 143, 43, 44, 347; 106/19 R; 358/75, 80, 534, 536, 298

[56] References Cited

U.S. PATENT DOCUMENTS

| | | | |
|---|---|---|---|
| 3,663,221 | 5/1972 | Higgins et al. | 430/22 |
| 4,011,812 | 3/1977 | Julian Lecha | 101/177 |
| 4,149,183 | 4/1979 | Pellar et al. | 358/75 |
| 4,180,407 | 12/1979 | Gibson et al. | 106/26 A |
| 4,729,909 | 3/1988 | Noack | 427/288 |
| 4,758,886 | 7/1988 | Rylander | 358/80 |
| 4,918,622 | 4/1990 | Granger et al. | 358/298 |
| 4,924,301 | 5/1990 | Surbrook | 358/75 |
| 4,989,079 | 1/1991 | Ito | 358/80 |
| 4,989,080 | 1/1991 | Ito | 358/75 |
| 5,053,887 | 10/1991 | Thompson | 358/457 |
| 5,144,419 | 9/1992 | Nakatsuka et al. | 358/75 |
| 5,166,809 | 11/1992 | Surbrook | 358/456 |

OTHER PUBLICATIONS

*Reproduction Review*, Oct. 1965, pp. 6, 10.
*The Photoengraver Bulletin*, Nov. 1949, pp. 43–44.
"Pantone® Metallic Integrated Process Color Selector", by Pantone Metallic–Buntdruck–Farbskala (Pantone).
"Lithographic Guidelines For Metallic Integrated Process Printing" (Crofield).

*Primary Examiner*—Charles L. Bowers, Jr.
*Assistant Examiner*—J. Pasterczyk
*Attorney, Agent, or Firm*—Jones, Day, Reavis & Pogue

[57] ABSTRACT

A method of reproducing on a substrate an image incorporating metallic inks involves scanning (18) the image to be reproduced and creating (20) four color separations of the scanned image. Metallic gold and/or metallic silver color separations (22, 24) are created by electronically selecting any color area where the effect is desired. Next, the color separations are edited by creating (26) an electronic yellow mask of the image and adjusting (28) the desired tonal range of the metallic areas. The mask edges of each color separation can also be softened (34). The scanner then outputs (36, 38) the separations to film. The image is then reproduced by printing each of the process color separation films (44, 48) and the metallic separation films (42, 46) onto a substrate.

12 Claims, 2 Drawing Sheets

METALLIC COLOR PRINTING PROCESS

TECHNICAL FIELD OF THE INVENTION

The present invention relates to a metallic color printing process. Specifically, this method produces an improved metallic image by printing the subtractive primary colors, black, metallic gold and/or metallic silver at four screen angles.

BACKGROUND OF THE INVENTION

The reproduction of color was first achieved by Scottish physicist James Maxwell in the mid 1850's. Maxwell photographed a scene three times, once through a red filter, once through a green filter, and once through a blue filter. These black-and-white negatives were contacted to produce positives that were then mounted as slides. Each slide was placed in a different projector and the images were focused together on a screen. A red, green, or blue filter was placed over the lens of each respective projector, thus producing a color image on the screen.

The first single film image for color photography was produced by Louis Ducos du Huron in France in the late 1860's. In his system, the image on a black-and-white panchromatic emulsion was broken up by a series of red, green, and blue transparent dots or lines that formed a screen in front of the emulsion. The dots and lines were so small that they could not be resolved by the eye. After exposure, the film was reversal-processed to yield a colored positive transparency. The additive-color transparency is still used by the Polaroid Corporation with their 35-ram Polachrome slide process.

The development of the subtractive color systems was also pioneered by du Huron. He suggested making separation negatives through red, green, and blue filters, then making positive transparencies from each, dyeing them with colors that absorb each respective primary color (i.e. cyan, magenta, and yellow). This subtractive method is difficult to use because it requires the accurate registration of the colored positives or the accurate registration of images from dyed positive matrices. The solution was a three-emulsion film, each layer made sensitive to a different color (red, green, or blue) and then dyed a different color (cyan, magenta, or yellow) in processing. The first successful film of this type was Kodachrome, introduced by the Eastman Kodak Company in 1935.

Printed color reproduction is based on many of the same principles as film color reproduction. Instead of a continuous image, allowed by the film medium, a series of dots are printed on a substrate. These dots are printed in the subtractive primary colors of cyan, magenta, and yellow. Additionally, black is used to adjust the contrast of the image. In the subtractive process, a white substrate is used and red, green, and blue are essentially subtracted to achieve black. By contrast, in the additive system, a black background (i.e. a blank TV screen) is used, and red, green, and blue are added to achieve white. In the additive system the following combinations create the following results:

Red+Green=Yellow
Red+Blue=Magenta
Green+Blue=Cyan
Red+Green+Blue=White

In the subtractive process, the following is true:

White+Yellow+Cyan=Green
White+Magenta+Cyan=Blue
White+Magenta+Yellow=Red
White+Yellow+Magenta+Cyan=Black Moreover, each subtractive primary color when added with white produces that same subtractive primary color.

The objective in printing is to produce yellow, magenta, and cyan printing plates that are negative records of the amounts of blue, green, and red in the original. This is achieved by first photographing the original, in turn, through blue, green, and red filters. These films may then be converted into a halftone dot image suitable for a given printing process. The films are then used to make the image carriers, which may be plates, cylinders, or stencils. Each plate is inked with its appropriate ink, which is then transferred to a white substrate.

The image produced is largely dependant upon dot size and orientation. Orientation is defined primarily by the screen angle of the dot. The screen angle is the angle at which the rulings of a halftone screen are set when making screened images. In other words, the screen angle of a dot is the angle of the line which bisects the often elliptical dots. Standard screen angles have been established for various colors of dots: Magenta (45°), Cyan (75°), Yellow (90°), Black (105°). The interaction of screen angle, color, and dot size effect the quality of the reproduction.

Printing metallic colors, such as metallic gold and metallic silver, poses additional problems. Gold has typically been treated as a shade of yellow, while silver has been treated as a shade of gray. Thus the brilliance of these colors is diminished by the blending of hues which occurs in a four color printing system.

A system known as Metallic Integrated Printing Process (MIPP) has been developed for the reproduction of metallic colors by Eckart-Werke Metal Pigments and Powders of Furth, Bayern, Germany. This system requires numerous steps. First, a designer marks-up the artwork to be copied to designate those areas where the MIPP system is required, i.e. metallic colored areas. Next, a conventional four color separation is produced of the artwork. Each separation is then compared to the original artwork to see which separation gives the best representation of the metallic colors. Based on the object color in the original photograph and the color requirements of the final print, a determination is then made whether gold or silver is required. Most shades of gold can be obtained from silver and yellow. However, a high percentage of yellow on silver greatly reduces the metallic brilliance. In addition, silver has a grey value of approximately 30% that tends also to reduce the metallic brilliance and thereby dirty colors.

After the four color separations are made, two separations used to print the metallic inks must be developed from two of the four separations. Typically the cyan or black separation will give the best basis for developing the silver separation and either the yellow or magenta for the gold separation. The selected separations are then duplicated to become the gold and silver separations. These separations may require modification to remove image areas where a metallic effect is not required. Comparison with the original transparency may indicate the need to enhance some image areas so as to improve the final metallic effect. The MIPP system anticipates the softening of mask edges of the metallic colors to avoid sharp cut-out effects when the final result is printed. In practice, the task of softening of mask edges can be handled using electronic image processing equipment.

With the MIPP systemic, a screen angle must be freed for each of the metallic inks to avoid problems of screen clash and resulting moire effects. This can be accomplished by using achromatic or Under Color Removal, ("UCR") color separation techniques where the process color with the lowest value is eliminated in favor of black. UCR involves the technique of reducing the cyan, magenta, and yellow content in neutral grey shadow areas of a reproduction and replacing them with black ink so that the reproduction will appear normal but will use less process color ink. (From the Complete Color Glossary by Miles Southworth, Thad McIlroy and Donna Southworth, Copyright 1992; Published by The Color Resource, Livonia, N.Y. ISBN 1-879847-01-9). Often the cyan will have the lowest value and is the color to eliminate. Since both gold and silver have a process color value, the four conventional separations will need to be modified if the finished print is not to look over-colored or dirty. For example PANTONE 873, the MIPP gold standard, has a process color value of approximately 65% yellow, 25% magenta and 5% cyan. So if the gold areas are to look realistic these colors must be reduced proportionately. The separations may also require modification as the metallic inks have a grey scale value and a failure to take this into account may result in a dirtying of the final colors due to a reduction in their metallic brilliance.

A MIPP image is printed using standard screen angle intervals of 30° or 15°. The screen angle used for a metallic ink is the same as that for the process colors eliminated in favor of a metallic ink. The MIPP system may use different dot shapes to reduce the risk of screen clash. A round dot, with no preferred direction, is typically used for the metallic ink, while an elliptical dot works for the standard process inks. The color standards chosen for MIPP come from the PANTONE System of matched metallic inks, with PANTONE 873 as the gold standard and PANTONE 877 as the silver standard.

Because metallic inks are opaque, they are normally printed before the transparent process colors. But with MIPP the sequence is changed slightly so that the first three colors down are silver, yellow, and gold, respectively. The remaining three process colors are printed in any order. The first three colors, in this order, are very important if the finished print is to look realistic. The use of yellow on silver is necessary to obtain yellow, green and orange metallic effects. Yellow, under gold, is also necessary to maintain the correct tonal values in the highlight areas. Yellow, printed in this way, provides a transition from gold to non-metallic pans of the image. On the other hand, if yellow is printed on top of the gold, there is a loss of metallic sheen without any compensating color benefit.

In summary, the MIPP system presents several disadvantages. First, it requires excessive handwork to create the color mash. Second, the MIPP system requires the elimination of one of the subtractive process colors to free up a screen angle for a metallic color. Third, the MIPP system only allows the printing of four screened colors in any given area. Last, the PMS 873 standard gold ink used by the MIPP system is a dirty, or less brilliant gold ink. This dirty look limits the gold color reproduction to the inherent dirty look even if no other color ink is printed in that area. This dirty look also necessitates additional color correction of the subtractive primaries. Therefore, a need exists for a printing process which maximizes the appearance of metallic colors. Such a process should allow the use of six colors printed at four screen angles. Moreover, such a process should not limit the number of colors in any given area to four as with the MIPP System.

SUMMARY OF THE INVENTION

The present invention relates to the Williamson Integrated Metallic System (WIMS) developed to allow six color printing using yellow, magenta, cyan, black, metallic silver, and/or metallic gold. The WIMS System creates a realistic metallic gold or metallic silver effect using the subtractive primary colors, black, silver and/or gold. The WIMS method comprises a number of steps. The subject to be reproduced is first scanned by a standard scanner and four color separations are created. The original art is then edited to achieve the required metallic effect. Editing comprises the steps of creating a yellow mask, reviewing an electronic version of the image produced by the scanner, determining the amount of contrast between heavy and light metallic regions on the image by one skilled in the art based on past experience, and then sending that contrast information back to the scanner. A "yellow mask" is created to isolate areas where a metallic effect is desired. This "yellow mask" allows the operator to select these areas based on the color and tonal region of the original. For example, those areas appearing neutral are appropriate for silver metallic, while those areas appearing high yellow with a red component are appropriate for the gold metallic. Additional modification of dot size in these isolated areas may be required to avoid moire and reduction in metallic brilliance of the final colors. These colors can be printed at four screen angles: cyan (75°), magenta (45°), silver (45°), gold (75°), yellow (90°), and black (105°).

In the WIMS System, a cleaner, or more brilliant gold color ink is used, wherein the process color value is less than 25% for magenta and less than 5% for cyan. This should diminish any dirtiness caused by the process color values of adjacent primary colors. Additionally, any harsh edge effects caused during printing may be softened during the electronic masking stage. During printing, the silver separation can be printed at the same screen angle as the magenta, while the gold separation can be printed at the same screen angle as the cyan separation.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1:
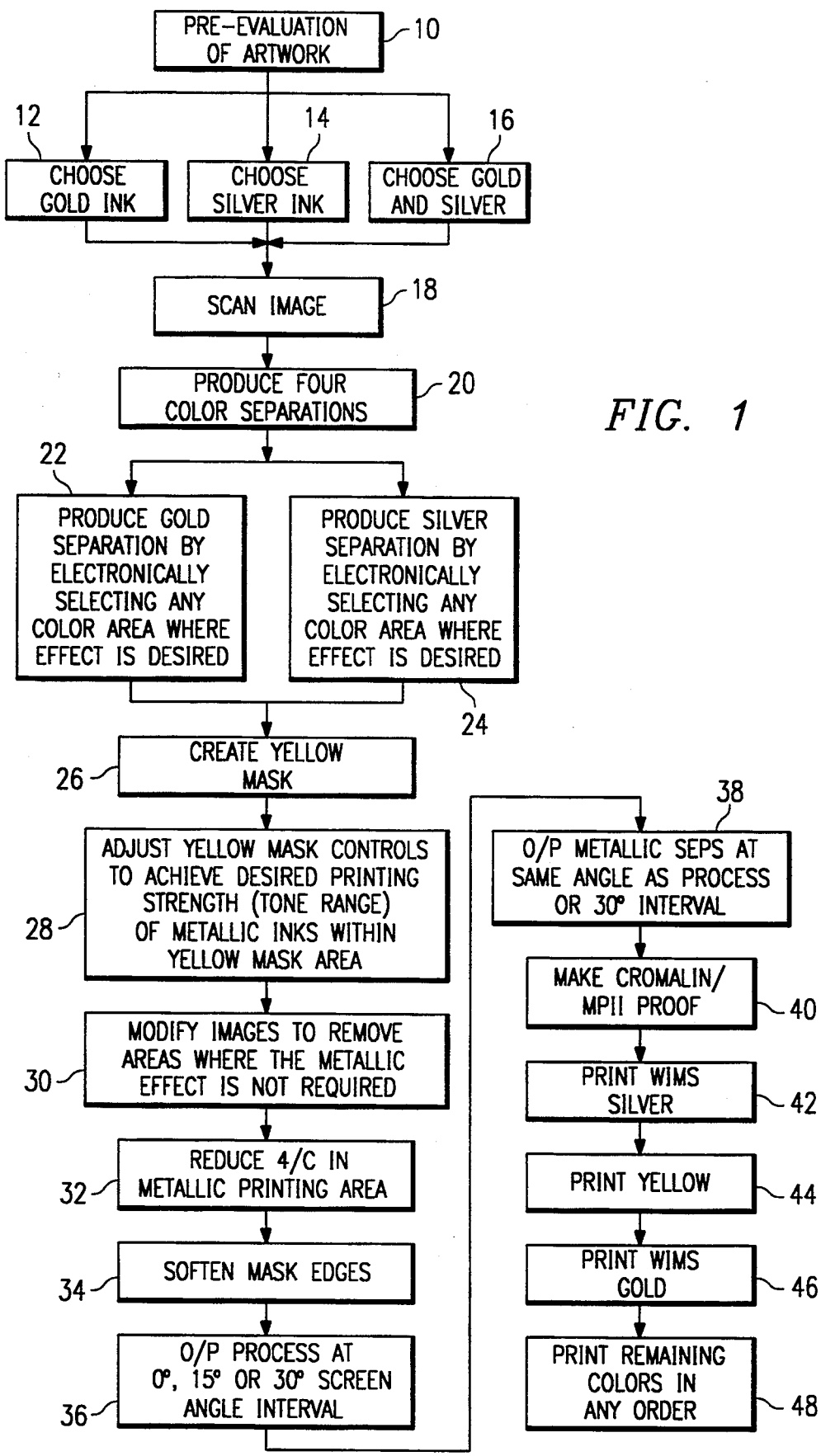
FIG. 1 illustrates a flow chart of the WIMS System for reproduction of metallic color.

The present invention relates to a metallic color printing process, also known as the WIMS System, that overcomes many of the disadvantages found in the prior art. Referring to FIG. 1, a flow chart illustrates the steps involved in the present method.

A first step involves pre-evaluation at step 10 of the subject to determine desired effects and proper placement of metallics in process reproduction. Metallic gold can be chosen at step 12, metallic silver can be chosen at step 14, or a combination of both metallic gold and metallic silver can be chosen at step 16. Next, the image can be scanned at step 18 by a scanner which, in turn, produces at step 20 four color separations which are electronically viewed on the scanner display. The scanner acts as both an input device and an output device. In other words, the artwork is input to the scanner. The scanner can then output color separations or film used to recreate the artwork. The scanning step involves the application of 75% to 100% to the scanner set-up and the scanning of the image. Then, the PCR is removed from the scanner set-up and the image is scanned to an "Imagedit", an electronic color correction machine, produced by the Crosfield Co. of Hemel Hempstead, England.

The original artwork is evaluated in a well known manner by one skilled in the art to determine the color areas in which the metallic effect is desired. A gold separation can be produced at step 22 by electronically selecting any color area where the effect is desired. Likewise, a silver separation can be produced at step 24 by electronically selecting any color area where the effect is desired. Typically, the cyan or black areas of the original art will be the basis for developing the silver printing whereas yellow or magenta areas of the original art will form the starting point for creating the gold printing. It is emphasized that either the gold or silver separations may be produced by selecting any color area where the effect is desired.

Using the Crosfield Imagedit, a "yellow mask" can then be created at step 26 to isolate the areas where a metallic effect is desired from the rest of the separation. The "yellow mask" function gives the ability to select the desired areas electronically based on the tonal region or bandwidth of the original as well as the desired color region. Creating a yellow mask entails several steps. First, an electronic version of the image produced by the scanner displays the contrast between a heavy metallic region and a light metallic region on the image. For example, neutrals are appropriate for silver, while high yellows with a red component are appropriate for gold. The yellow mask controls can be adjusted at step 28 to achieve desired printing strength (tonal range) of metallic inks within the yellow mask area. These controls allow the adjustment of slope, gain, and rolloff of the image within the yellow mask area.

Next, the Imagedit computer creates six revised color separations in a well-known manner; one each for yellow, cyan, magenta, black, gold and silver. Once these electronic masks are created, further modification at step 30 of the isolated area may be required. For example, such modifications may increase or reduce the printing dot size of the metallic separation and/or adjust at step 32 the amount of four color process ink printing over the newly created metallic to compensate for the reduction in brilliance caused by the additional metallic color in the reproduction. Additionally, in a given original, there may be areas of similar color where a metallic effect is desired in one area but not the other. For example, a gold watch requires a, metallic gold, while a golden retriever would not. Due to this anomaly, further electronic manipulation of the image may be required to eliminate metallic ink in unwanted areas. Moreover, because all masking is performed electronically, it is possible to soften at step 34 any harsh edge effects in the final reproduction via mask smoothing or tonal integration techniques.

Next, this information is sent back to the scanner which outputs at step 36 the subtractive process colors and the metallic separations. The MIPP standard for screening is to eliminate (by hand masking) one of the process colors in metallic areas to free-up a screen angle, or to produce the metallic separations at a line screen resolution different than the process colors to reduce moire effects. However, in the WIMS process, the subtractive process colors are output at step 36 at 0°, 15°, and/or 30° screen angle intervals. An interval is the spacing between any two screen angles. The metallic color separations are output at step 38 at the same angles as the subtractive process colors or at 30° intervals. The gold separation can be produced at the same screen angle as the cyan separation. Likewise, the silver separation can be produced at the same angle as the magenta separation. Therefore, with WIMS reproductions, six colors can be printed at four screen angles. For example, cyan can be printed at 75°, magenta at 45°, silver at 45°, gold at 75°, yellow at 90°, and black at 105°. Both process and metallic separations are produced at the same line screen resolution. Typically, there are no problems with moire effect.

The next step involves metallic inks: a gold ink, a silver ink, or both gold and silver. The Pantone MIPP standard for gold ink is PMS 873. This ink printed solid has a process color value of approximately 65% yellow, 25% magenta and 5% cyan. For WIMS reproduction, however, a much more brilliant gold ink is used, wherein the magenta and cyan process equivalents are greatly reduced. This was selected under the rationale that a pure gold ink area of WIMS gold could be reduced in brilliance, but a pure PMS 873 ink area could not be made any more brilliant than the inherent bronze color of the ink. This same color compensation theory also applies to silver areas where a calculated reduction in cyan or black generally occurs.

Prepress proofing at step 40 is accomplished via a combination of 3M Matchprint II (for process colors) and Dupont Cromalin (for metallics). After proofing, the artwork is reproduced by first printing at step 42 the WIMS standard for silver, then printing at step 44 yellow, then printing at step 46 the WIMS standard for gold, and finally printing at step 48 the remaining subtractive primary colors in any order.

Figure 2:
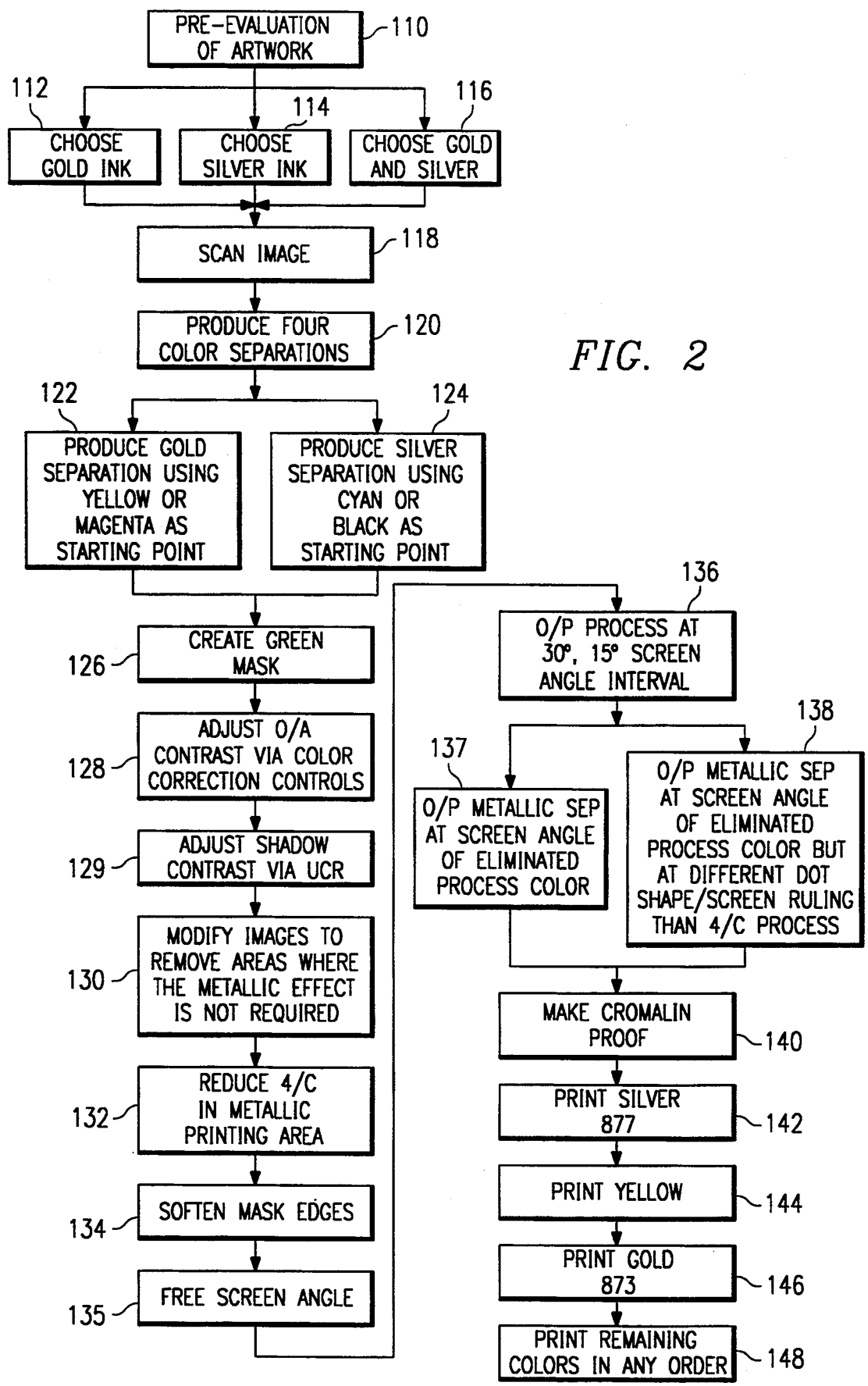
FIG. 2 illustrates a flow chart of the prior art MIPP System.

FIG. 2 provides a flow chart of the MIPP process which is discussed in greater detail in the Background Section. In sum, the designer marks up the artwork to be reproduced to show where MIPP is required and the image is scanned at step 118. Based on the object color in the original photograph and the color requirements of the final print, a determination is then made whether to choose at step 112 gold, choose at step 114 silver, or to choose at step 116 both silver and gold. The artwork is then scanned at step 118 by a scanner and a standard four-color separation is produced at step 120. Each separation is compared to the original to determine which gives the best representation of the metallic colors. A gold separation is next produced at step 122 using the screen angle of the process color that was eliminated in that area, as will be discussed in greater detail. Likewise, a silver separation can also be produced at step 124 using the screen angle of the process color that was eliminated in that area.

A green mask is created at step 126 with the scanner and viewed on the scanner display. The overall contrast of the green mask can be adjusted at step 128 via the color correction controls. Shadow contrast can then be adjusted via undercolor removal (UCR). Next, the image is modified at step 130 to remove areas where the metallic effect is not required. The level of the four subtractive process colors can be reduced at step 132 in the metallic printing area. Mask edges can then be softened at step 134.

Next, a screen angle must be freed at step 135 for each of the metallic inks to avoid problems of screen clash and resulting moire effects. In other words, in any one area where a metallic ink is used, the subtractive primary color with the same screen angle must be eliminated or made solid. Thus, no more than four screened colors may appear in any one area of the reproduction. The scanner outputs at step 136 the subtractive process colors to film at 30° and 15° intervals. The scanner can then output at step 137 the metallic separations at a screen angle of an eliminated process color. Alternatively, the scanner can output at step 138 the metallic separations at the screen angle of the eliminated process color but at a different dot shape and/or screen ruling than the four subtractive process colors. Prepress proofing at step 140 is accomplished. After proofing, the artwork is reproduced by first printing at step 142 the PMS 877 standard for silver, then printing at step 144 yellow, then printing at step 146 the PMS 873 standard for gold, and finally printing at step 148 the subtractive primary colors in any order.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

We claim:

1. In a method of half-tone dot printing a reproduction of a scanned image on a substrate with the four subtractive process colors of magenta, cyan, yellow, and black in a given area of the scanned image at only four screen angles, an improved method of incorporating metallic colors in said reproduction, the improvement comprising the steps of:

printing at least one metallic color in said given area at a selected one of the only four screen angles; and printing at least one of said four subtractive process colors in said given area at the same screen angle as said at least one metallic color such that said at least one metallic color and one process color are printed in said given area at the same one of said four screen angles so as to enable at least five colors to be printed at only said four screen angles.

2. A method as in claim 1 further including the steps of:

printing a second metallic color in said given area at a second one of said four screen angles; and printing a second one of said four subtractive process colors in said given area at the same second one of said four screen angles as said second metallic color so as to have an additional metallic color and an additional process color printed in said given area at said second one of said four screen angles so that up to six colors are printed at only said four screen angles.

3. The method of claim 1 of reproducing a scanned image on a substrate including incorporating metallic colors and further comprising the steps of:

producing four process color separations of the scanned image, each at one of said four screen angles;

producing at least one metallic color separation at the same screen angle as a corresponding first one of the four screen angles of the process color separations in said given area;

editing each process color separation and the at least one metallic color separation to obtain metallic color separation information;

outputting each process color separation to film creating a process color separation film;

outputting the at least one metallic color separation to film creating a first metallic color separation film; and printing a reproduction of the scanned image on a substrate using the process color separation films and the at least one metallic color separation film such that both a metallic color separation and a process color separation are produced at the same screen angle.

4. The method of claim 3 of reproducing a scanned image on a substrate including metallic colors anti further comprising the steps of:

producing a second metallic color separation at the same screen angle as a corresponding second one of the four screen angles of the process color separations in said given area;

editing the second metallic color separation to obtain metallic color separation information;

outputting the second metallic color separation to film creating a second metallic color separation film; and printing a reproduction of the scanned image on a substrate using the process color separation film and the first and second metallic color separation films such that said first metallic color separation and a first process color separation are produced at an identical first screen angle and the second metallic color separation and second process color separation are produced at a second identical screen angle so as to enable up to six colors to be printed in the given area in only four screen angles.

5. The method of claim 4 wherein the step of producing a first and a second metallic color separation further comprises the steps of:

producing a gold metallic color separation as the first metallic color separation; and producing a silver metallic color separation as the second metallic color separation.

6. The method of claim 4 wherein the step of producing a first and a second metallic color separation further comprises the steps of:

producing a silver metallic color separation as the first metallic color separation; and producing a gold metallic color separation as the second metallic color separation.

7. The method of claim 4 wherein the step of editing further comprises the steps of:

reviewing an electronic version of the scanned image to determine regions of the image where metallic color is to be added;

creating a yellow mask for the given area to enable isolation of any region therein where metallic color is to be printed;

electronically adjusting the amount of contrast between the isolated regions to achieve a desired metallic color contrast between said isolated regions so as to obtain metallic color separation information; and sending the metallic color separation information back to the scanner to provide half-tone dot signals.

8. The method of claim 4 wherein the step of outputting the at least one metallic color separation further comprises the step of outputting the first metallic color separation at the same screen angle as a first process color separation or at a 0°, 15°, or 30° interval therefrom.

9. The method of claim 4 wherein the step of outputting the second metallic color separation further comprises the step of outputting the second metallic color separation at the same screen angle as a second process color separation or at a 0°, 15°, or 30° interval therefrom.

10. The method of claim 3 wherein the step of editing further comprises softening an image edge of the process color separations and metallic color separations.

11. The method of claim 3 wherein the step of outputting the process color separations comprises outputting the process color separations onto film at 0°, 15°, or 30° screen angle intervals.

12. The method of claim 1 wherein the step of printing comprises:
(a) printing the metallic silver onto the substrate;
(b) printing yellow onto the substrate;
(c) printing the metallic gold onto the substrate;
(d) printing the remaining colors onto the substrate in any order.

* * * * *